United States Patent [19]

Bambrick

[11] Patent Number: 4,960,554
[45] Date of Patent: Oct. 2, 1990

[54] METHOD FOR MAKING HELICALLY WOUND EXTRUDATE PARTICLES

[75] Inventor: William E. Bambrick, Old Greenwich, Conn.

[73] Assignee: American Cyanamid Company, Stamford, Conn.

[21] Appl. No.: 52,811

[22] Filed: May 21, 1987

Related U.S. Application Data

[63] Continuation-in-part of Ser. No. 785,185, Oct. 7, 1985, Pat. No. 4,673,664.

[51] Int. Cl.$^5$ ............................................. B29C 47/12
[52] U.S. Cl. .................................... 264/219; 264/225; 264/317; 264/318; 425/461; 425/463
[58] Field of Search ........... 264/219, 220, 225, 211.11, 264/317, 318, 334, 335, 177.11, 177.13, 141–142; 425/461, 463, 464, 467, 381, 382 R, 465, 466

[56] References Cited

U.S. PATENT DOCUMENTS

| | | |
|---|---|---|
| 1,338,799 | 5/1920 | Thomas ............................... 425/463 |
| 1,577,336 | 3/1926 | Marsden ......................... 264/177.11 |
| 2,227,956 | 1/1941 | Boynton et al. ..................... 264/318 |
| 2,376,742 | 5/1945 | Wempe ................................. 264/317 |
| 2,422,994 | 6/1947 | Taylor ................................... 425/467 |
| 2,604,662 | 7/1952 | Bodkin ................................. 264/141 |
| 3,150,222 | 9/1964 | Blaustein et al. .................... 264/318 |
| 3,290,421 | 12/1966 | Miller, Jr. ............................ 264/219 |
| 3,365,528 | 1/1968 | Riley .................................... 264/334 |
| 3,491,181 | 1/1970 | Keil et al. ............................. 264/219 |
| 3,695,573 | 10/1972 | Huffaker et al. .................... 264/219 |
| 3,980,747 | 9/1976 | Nakagawa et al. .................. 264/220 |

FOREIGN PATENT DOCUMENTS 1018219  10/1957  Fed. Rep. of Germany ...... 425/461

Primary Examiner—Jeffery Thurlow
Attorney, Agent, or Firm—Gordon L. Hart

[57] ABSTRACT

An extrusion die useful for forming helical extrudate particles of inorganic oxide materials, is made by molding the die around pins having helical outer surface to form extrusion holes in the die. Helical walls of the extrusion holes are formed by the helical shape of the pins. When the molded die is formed, the helical pins are unscrewed out of the helical holes in the die to avoid damage to the die.

3 Claims, 2 Drawing Sheets

METHOD FOR MAKING HELICALLY WOUND EXTRUDATE PARTICLES

This is a continuation-in-part of my copending U.S. Pat. application Ser. No. 785,185 filed Oct. 7, 1985, now U.S. Pat. No. 4,673,664 patented June 16, 1987.

The invention relates to improvements in process and apparatus for making extrudate particles of alumina or other extrudable inorganic oxides and more particularly for making such extrudates having the outer surface shape of three or four segments extended along the particle length and helically wound about the longitudinal axis of extrusion. The extrudates are filled within the outer shape with the extruded material.

My copending U.S. Pat. No. 4,673,664 described extrudate particles having such helically wound outer surface features, and the use of such particles as catalysts or catalyst support materials.

For making those shaped extrudate particles an extrusion paste of a selected catalyst or catalyst support material, typically an alumina or other inorganic oxide material, is extruded through an extrusion die having one or more specially shaped holes. An extrudate strand having the extended helically wound surface features is continuously formed by extrusion of the paste through the die. Each hole for extrusion through the die is a tube whose inner walls are formed with helical concave grooves, preferably three or four, defining the tube walls in the die. When extrusion paste is forced through each tube in the die, the helical concave grooves in the tube wall will form and shape helical convex segments along the outer surface of the extrudate strand. As the strand of extruded material emerges from the extrusion die, the extruded strand retains its helical outer surface shape that was formed in the die. The strand is cut into particles of desired length which can then be hardened, by drying and calcining for example, to fix the shape of the finished extrudate particles.

The extrudate paste from which the extrudate particles are formed may be any material that is suitable making extruded catalysts or catalyst supports, or desiccants or the like. This material may comprise one or more of the porous, refractory inorganic oxides such as various aluminas, silica, zirconia, titania and the like. Examples are various catalysts used in petroleum refinery catalytic processes. The paste material for extrusion may further comprise other catalyst materials, such as molybdenum compounds for example as sometimes used in making petroleum hydrotreating catalysts. The paste may include modifiers of various kinds, such as organic particles for example, which are removed by calcining the particles after they have been formed by extrusion. Molecular sieves may be included as modifiers for making desiccants or acidic catalysts, for example. Some liquid, usually water is used to make the paste. Acidic and/or alkaline modifiers may be included in the paste. The paste is prepared and brought to the plastic consistency necessary for extrusion and to hold the extrudate shape after extrusion. Preparation of suitable extrusion pastes of materials such as inorganic oxides is known and the invention can be carried out using conventional prior art extrudate paste compositions of the kinds that are suitable for making extruded catalysts and catalyst supports.

In my copending U.S. Pat. No. 4,673,664, extrusion dies for making helical extrudate particles were described. The dies are made by forming a hardenable liquid or plastic die-making material in a mold of a shape desired for the body of the die. To form holes in the die, through which extrusion paste will be extruded, the hardenable material of the die is molded around pins which extend through the body of the die. These pins have been formed to have shafts of the desired outer helical shape of particles that are to be formed by extrusion through the die. The helical shape of the inner wall of each hole in the die is molded by the outer helical shape of the pin. The die body is then hardened in the mold, as by setting an epoxy-resin-forming liquid, or by heating a thermosetting plastic resin, or by cooling a molten metal or thermoplastic resin, or by whatever means is used to harden the selected die material. The hardened die is then removed from the forming mold.

To remove the pins from the hardened die, each pin must be unscrewed out of its corresponding die hole in order to prevent damage to the helically shaped inner walls of the die. If the helical pin were pulled straight out, without turning it, the helical shape of the walls would be stripped away by the pin.

According to the invention, a die having one or more helically shaped extrusion holes extending through the die, preferably parallel to the axis of the die, is formed by molding the die in a mold which comprises several helical pins for molding the several helical holes in the die. In a preferred embodiment the die has more than one extrusion hole and each pin is mounted to the base of the mold by mounting means which holds the pin at its fixed position in the mold while permitting rotation of the pin at its fixed position in the mold. To remove a formed and hardened die from the mold, the die is withdrawn away from the base of the mold while each of the pins mounted on the base is rotated at its fixed position in order to unscrew each helical pin out of its helical hole as the die is withdrawn.

Pins for forming die holes in the die will be of approximately the same diameter as the desired diameter of finished extrudate particles that are to be formed by the die. Some allowance may have to be made for possible slight shrinkage of the die material on hardening, which would slightly increase the diameter of the finished die hole, or for possible shrinkage of the extrudate particles after extrusion upon drying and calcining to finish the particles. The pins may be made of any suitable material such as plastic or metal. We prefer to use a relatively rigid metal such as steel wire for example. Three or four metal wires may be twisted to make a helical pin having three or four lobed segments extended helically along the axis of the pin. Other methods may be used to make pins having the outer shape of three or four helical sections extended along the axis and wound helically along the length of the pin. A rod or wire may be drawn through cutting dies or otherwise machined to form the desired outer helical shape on the surface of the rod or wire. For making extremely fine pins or for forming helical sections of varied shapes on a rod or wire surface, fine machining by electrochemical means may be preferred. The outer surface of the pins may be formed in a variety of helical shapes, in which various curved or angular helical lobes may be separated by angular or curved helical grooves. Thus a cross section of the pin may be any of various generally circular or elliptical shapes having outline shapes of three or four segments of angular or fluted or scalloped lobes, for example, which may be connected to each other or separated by helical scallops, slots or grooves around the center of the cross section. The helical surface of the pin is defined by extending its cross section helically along the axis of the pin to form, for example, a helically slotted cylinder or a helically scalloped cylinder.

A preferred embodiment of the invention is described in more detail by reference to the drawings.

Figure 1:
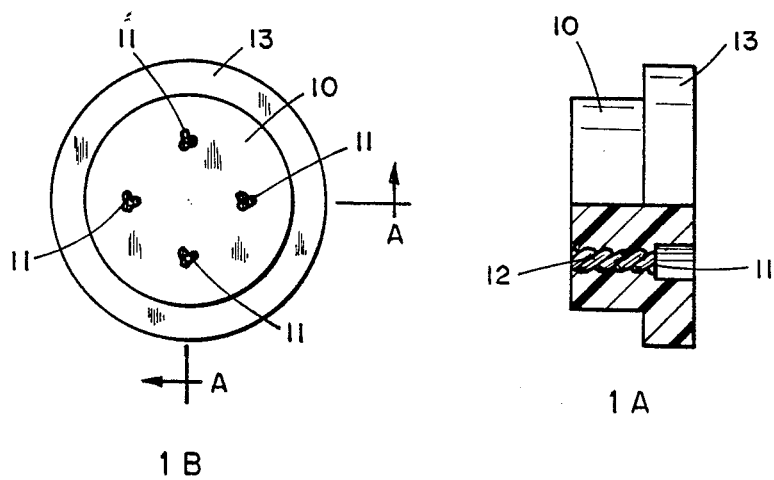
FIG. 1 shows front view FIG. 1B and side view FIG. 1A of a die with a cutaway section showing the inner walls of one extrusion hole through the die.

Referring now to FIG. 1, a die consists of a die plug 10 having a body shaped to fit in the header of an extruder barrel for extrusion of paste through extrusion holes 11 in the die. At the cutaway portion of FIG. 1 the helical shape of the inner walls 12 of one extrusion hole is shown. As extrusion paste is forced through the hole, the paste forms an extrudate having the helical outer shape formed by the helical inner walls of the die.

Figure 2:
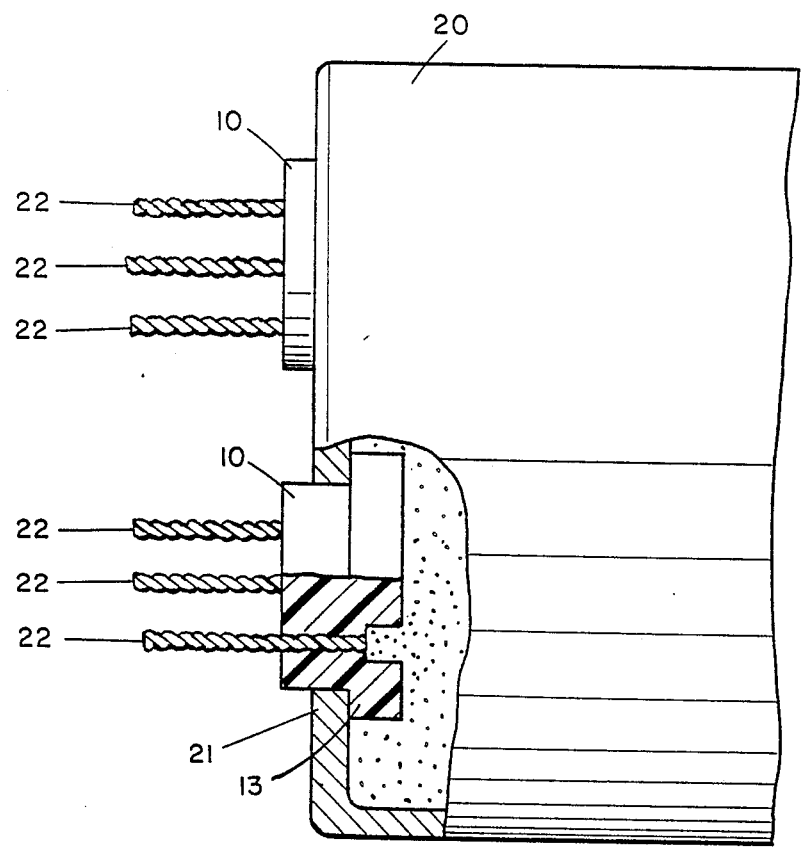
FIG. 2 is a side view of the header on an extruder barrel showing die plugs mounted in the header, and illustrating extrusion of paste through the dies to form extrudates. The cutaway section shows the die configuration inside the header plate.

FIG. 2 shows the extrusion end 20 of an extruder barrel with several die plugs 10 mounted in holes through the header plate 21 of the extruder barrel. Each die plug has a flange 13 at one end of its body 10 to retain the die in the header. Extrudates 22 are shown issuing from the dies in FIG. 2.

A die plug can be formed in any suitable mold. To illustrate the invention reference is made to FIG. 3 which shows an injection mold unit 30 consisting of a mold base 31 and a mold cover 32. The mold cavity 33 in the base defines the cylindrical shapes of the die body 10 and its flange 13 to be formed as a unit to make the die plug in the mold. To form extrusion holes through the die, the mold base is fitted with several pins 34, each having a helically formed section 35 of the shaft extending through the die cavity from the mold base to the mold cover. At the mold base, each pin 34 has a cylindrical shaft section 36 which extends from the helical section 35 of the pin shaft through a cylindrical pin hole in the mold base. The cylindrical shaft section is equipped at its other end with a flange 37 of diameter larger than the diameter of the pin hole. The pin can rotate freely in the pin hole to permit rotation of the pin, but the pin is fixed at its position in the mold by the fit of the cylindrical section 36 in the pin hole and by the flange 37 outside the mold. The mold cover 32 fits over the top of the mold base 31 to define the upper end of the mold cavity. Nipples 38 on the mold cover correspond in position to the ends of the pins 34 inside the mold cavity. The nipples extend from the cover a short distance into the mold cavity. Their outer diameter is slightly larger than the pin diameter and each is hollowed inside to fit over the end of one pin in the mold cavity to help hold the pins in position during molding.

Figure 3:
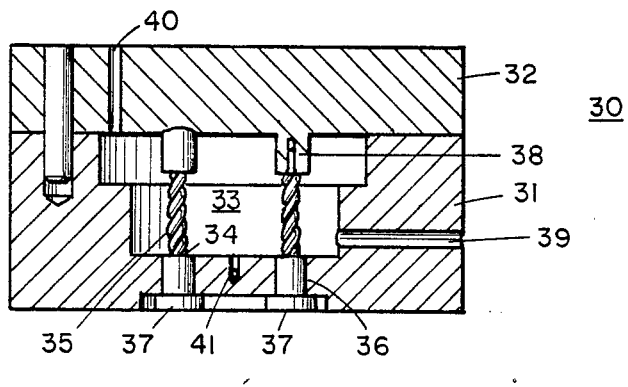
FIG. 3 illustrates a mold for making dies according to a preferred embodiment of the invention.

To assemble the mold for making die plugs, several pins are inserted through pin holes into the mold cavity from the bottom outside of the base. The mold cover is fastened over the mold cavity with one nipple fitted over the end of each pin as shown in FIG. 3. Fluid thermoplastic material is injected through injection port 39 in the mold to fill the mold cavity. Air displaced from the mold cavity escapes through an air vent 40 in the mold cover. The thermoplastic material fills the mold cavity and hardens in the mold to form a die plug.

The mold cover is removed and the die plug is ejected by any suitable means, such as a jet of compressed air fed through an air line 41 which extends through the mold base and opens into the bottom of the mold cavity. As the die is forced out of the mold, the pins are free to rotate, and they are turned by the force of the helical inner walls of the die holes bearing against the helical outer sections of the pins. Thus the pins are unscrewed from the die holes as the die moves out of the mold.

Instead of inscrewing the pins as described above, by reaction of the pin to the motion of the die in the mold, the pins can be rotated by turning the pins by their flanges outside the mold while the die is being withdrawn from the mold. The pin flanges may be fitted with lugs or gear teeth by which the flanges can be turned using a suitable tool outside the mold to turn the pins inside the mold.

Thermoplastic resins suitable for making die plugs by injection molding include high density polyethylene, polypropylene, thermoplastic acetal resins, some nylons, polycarbonates, and the like. Especially preferred resins for this use are Dupont Delrin ® 500 or 900 and Celanese Celcon ® M90, both being general purpose acetal resins.

A die plug according to the invention may be molded to another shape that is needed to fit a given header in a selected extrusion machine. Variations in the arrangement of the helical tube in the die plug can be made as desired. In some embodiments one may wish to extend the tube with helical grooves for only a portion of the distance through the plug, with holes of larger diameter at the inlet side extending into the plug as illustrated in the drawings, or at both ends of the hole, not illustrated, or at the outlet side only, not illustrated.

Such holes of larger diameter are formed in the mold by extending the nipples 38 into the mold at one end of the pin as illustrated in FIG. 3, or may be formed by extending the cylindrical shaft sections 36 of the pin partly into the mold at the other end of the pin, not illustrated.

The size of die plugs to be made by the invention will depend to some extent on the size of the extrusion barrel in which the plugs are to be used. In a typical extrusion machine having a 5.1 cm barrel, a header plate at the end of the barrel is equipped with 4 holes for holding a die plug, each hole being 1.9 cm in diameter. Thickness of the header plate is 2.5 cm and the die plugs may extend part way or completely through the plate or even a few millimeters beyond the outer surface of the plate. The number of extrusion holes to be designed in each die plug will depend in part upon the size of the extrusion holes, the diameter of the plugs, and other factors familiar to persons skilled in this art. For use in a typical extruder, die plugs are made with 19 holes of 1.5 mm diameter in a single cylindrical plug whose body diameter is 1.9 cm, and whose body length is 6.3 mm, and which is fitted with a flange of about 2.5 cm diameter, 5 mm thickness.

Although the invention can be used to make dies for extruding various helical shapes, an especially preferred die makes helically lobed extrudates having three or four segments of tangent or overlapping cylinders wound helically about the axis of extrusion. Preferred pitch of the helix is in the range from about 4 to about 5 turns of one segment per 2.5 cm of the extrudate length when the extrudate diameter is 1.3 mm.

The invention is especially suitable for use in making extrudates of small diameters, e.g. from about 0.8 mm to about 1.5 mm in diameter, although the invention can be used to make larger extrudates as well.

We claim:

1. A process for making an extrusion die, useful for forming extrudates of inorganic oxide extrusion paste, with helical extrusion holes through the die for forming helical extrudates having the outer surface shape of three or four segments extended along the particle length and helically wound about the longitudinal axis of extrusion, said process comprising molding an extrusion die of hardenable molding material in a mold having more than one helical pin shafts for forming helical extrusion holes in the molded die, each pin shaft having the outer helical surface shape of the helical extrudate to be formed by said die, and each pin shaft in the mold extending through the length of said die and being fixed at its position in the mold and rotatable at said position;

hardening the molded die material in said mold;

removing the hardened die from the mold by rotating each of the helical pin shafts at its fixed position to unscrew each pin from the helical extrusion hole it has formed in the die.

2. A process defined by claim 1 wherein the mold is an injection mold and the hardenable molding material is a thermoplastic resin.

3. A process defined by claim 1 wherein the pins are rotated by force of the helical walls of each die hole bearing against the helical segments of the pin shaft in the hole as the die is withdrawn form the mold.

* * * * *